United States Patent Office 3,507,964
Patented Apr. 21, 1970

3,507,964
AGRICULTURAL PESTICIDAL COMPOSITIONS CONTAINING DIFLUORAMINO ORGANIC COMPOUNDS
Daniel D. Rosenfeld, Elizabeth, John R. Lovett, Edison, and Charles Wiener, Linden, N.J., assignors to Esso Research and Engineering Company, a corporation of Delaware
No Drawing. Filed Aug. 10, 1964, Ser. No. 388,723
Int. Cl. A01n 9/02, 9/20
U.S. Cl. 424—325                             8 Claims

ABSTRACT OF THE DISCLOSURE

This invention relates to new and useful pesticidal compositions prepared with a class of compounds containing the difluoramino, —$NF_2$, group by virtue of which these compounds are active ingredients of pesticides, particularly fungicides, nematocides, and insecticides.

This invention provides a method of using the difluoramino compounds for protecting materials against attack by low order organisms, e.g., to disinfect soils by destroying and checking the growth of bacteria, fungi, and insects therein. The pesticides containing the difluoramino compounds may be applied as eradicants or protectants to a variety of materials, such as seeds, seed beds, fibers, coatings, and other materials, including animal bodies. It has now been found that organic compounds such as ethers, aliphatic and cyclic hydrocarbons, alcohols, and carbonyl compounds containing —$NF_2$ constituent groups, are toxic to the parasites when used in effective amounts in pesticidal compositions. These difluoramino-containing compounds are generally prepared by one or both methods in which there is (1) the addition reaction of $N_2F_4$ to unsaturated compounds and (2) addition of $HNF_2$ to carbonyl compounds. Such compounds can be safely prepared at ambient reaction temperatures and can be safely handled in suitable diluents or carriers used for making the compositions which are to be applied as pesticidal preparations.

Among the solvents and diluents for the difluoramino organic compounds are such solvents as acetone, alcohol, paraffinic, naphthenic and aromatic hydrocarbons, chlorinated hydrocarbons and the Freons such as $CCl_3F$, $CCl_2F_2$, $CClF_3$, $CHCl_2F$, $CCl_2F$—$CClF_2$, and others of this type. The solvent may be normally liquid or liquefied so as to be useful in spray devices.

The difluoramino organic compounds to be used in the pesticidal composition may be selected from a wide variety of organic compounds such as the following:

Ethers (a) 1,2,3,1′,2′,3′-hexakis(difluoramino)propyl ether
(b) 2,3-bis(difluoramino)propyl allyl ether
(c) 1,3-bis(difluoramino)-1,3-dimethoxy propane
(d) 2,5-bis(difluoramino)dihydrofuran
(e) 2,3,4,5-tetrakis(difluoramino)tetrahydrofuran
(f) 1-difluoramino-1-methyl ethyl allyl ether
(g) 2,3-bis(difluoramino)dioxene
(h) 2,3,5,6-tetrakis(difluoramino)dioxane Hydrocarbons (a) 1,4-bis(difluoramino)butene-2
(b) 1,2,3,4-tetrakis(difluoramino)butane
(c) 1,2-bis(difluoramino)cyclohexane
(d) 1,1-bis(difluoramino)cyclohexane Alcohols (a) 1-difluoramino cyclohexanol
(b) 1-phenyl-1-difluoramino ethanol
(c) 2,3-bis(difluoramino)butanol Acids, Esters (a) 2,3-bis(difluoramino)propionic acid
(b) 2,3-bis(difluoramino)propyl acetate Aldehydes, Ketones (a) 2,3-bis(difluoramino)propyl methyl ketone
(b) 3,4-bis(difluoramino)cyclohexyl phenyl ketone Other varieties of these compounds may be employed with various modifications such as other alkyl or aryl substituents, a varying number of $NF_2$ substituent groups, as well as variations in functional substituent groups such as halogen substituents.

Representative of the difluoramino organic compounds mentioned and tested are 1,2,3,4-tetrakis(difluoramino)butane and 1,2,3,1′,2′,3′-hexakis(difluoramino)propyl ether.

EXAMPLE 1

Preparation of 1,2,3,4-tetrakis(difluoramino)butane

The formation of 1,2,3,4-tetrakis(difluoramino)butane having the formula

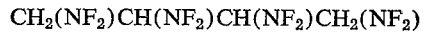

is accomplished by reacting two moles of $N_2F_4$ with butadiene preferably under pressures of 100 to 400 p.s.i.a. and at temperatures in the range of about 24° to 150° C. in a period of 1 to 20 hours.

The tetrakis(difluoramino)butane has a boiling point near 170° C., a freezing point near −70° C. and a density of 1.5 g./ml. at 25° C.

Dilute organic solutions were made up of the tetrakis(difluoramino)butane for conventional insecticide, fungicide and nematocide tests.

An acetone solution containing from 2.5 wt. percent to 0.005 wt. percent of the active ingredient was used for making tests on the common housefly and fungicide test. A solution of the tetrakis(difluoramino)butane in a mixed solvent (75% deodorized kerosene, 10% xylene, 10% acetone and 5% absolute ethanol) was used for making tests on cockroaches of the nonresistant strain. The comparative tests showed that the tetrakis(difluoramino)butane solutions were 100% effective at the 2.5% level in killing the cockroaches and had an extremely high knockdown rate. In the fungicide test the organisms used were *Monilia fructicola*, which causes brown rot of stone fruit and *Alternaria solani*, the organism which causes early blight of tomatoes and potatoes.

EXAMPLE 2

Preparation of 1,2,3,1′,2′,3′-hexakis(difluoramino) propyl ether

The 1,2,3,1′,2′,3′-hexakis(difluoramino)propyl ether has been made by reacting 1,2-divinyl ethylene oxide dissolved in carbon tetrachloride with $N_2F_4$ at reaction temperatures in the range of 100° to 150° C. The $NF_2$ group became linked to the carbons to give the product having the composition

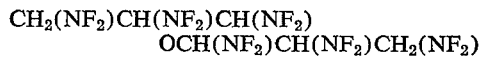

Test solutions of the hexakis(difluoramino)propyl ether were prepared using solvents and similar concentrations as indicated in Example 1 for 1,2,3,4-tetrakis(difluoramino)butane and the same kind of fly, cockroach and fungicide tests were made. The hexakis(difluoramino)propyl ether was found to be substantially more effective for killing house flies and cockroaches when used in the concentration range of 2.5 to 0.005 wt. percent with the liquid inert solvents.

The hexakis(difluoramino)propyl ether was found to be a highly effective nematocide, being at least equal to the standard (hexyl resorcinol) in its potency.

In the nematocide test the compound to be tested is diluted with inert solvent to various concentrations which are compared with the effects of hexyl resorcinol in similar solvent concentrations. The species Panagrellus is used as the test organism and data is recorded after 24 hours. Results of the tests are tabulated as follows:

TABLE I.—NEMATOCIDE

| Concentration | .1% | .01% | .001% | .0001% |
|---|---|---|---|---|
| Hexakis($NF_2$)propyl ether | 100 | 100 | 100 | 90 |
| Hexyl resorcinol | 100 | 100 | 100 | 90 |

The numbers under the specified concentrations represent percent mortality of Panagrellus after 24 hours.

Very striking evidence of the activity of the $NF_2$-containing compounds as fungicides is shown by the ability of the hexakis(difluoroamino)propyl ether, herein abbreviated HPE, to suppress the germination of the organisms, *Alternaria alteracea* and *Monilia fructicola*. Against the former it is as effective as the standard Captan and against the latter it surpasses the standard as fungistat.

In the fungicide test, a dilution series containing the active ingredients are tested. The test compounds are dissolved in reagent grade acetone. The activity of each test solution was determined by the percent of spore germination and is recorded after 24 hours. Results of the tests are tabulated as follows:

TABLE II.—FUNGICIDE

| Fungus | Concentration | .1% | .01% | .001% | .0001% | .00005% | .0000% | .000005% |
|---|---|---|---|---|---|---|---|---|
| Monila fructicola | HPE | (−) | (−) | −() | (−) | (−) | (∓) | (+) |
|  | Captan | (−) | (−) | (−) | (−) | (∓) | (∓) | (+) |
| Alternaria alteracea | HPE | (−) | (−) | (−) | (+) | (+) | (+) | (+) |
|  | Captan | (−) | (−) | (−) | (+) | (+) | (+) | (+) |

Signs indicate (−) 100% suppression of germination or (∓) partial or (+) 100% germination after 24 hours in contact with compounds.

The difluoroamino-organic compounds may be admixed in effective amounts with finely divided solid carriers as well as with liquid carriers, for example, with argicultural clays such as silicates or known dusting powders. The active difluoroamino-organic ingredients may be admixed also with other active pesticides and adjuvants. The carrier may be a volatile liquid, which acts as a fumigant.

The new class of pesticides herein described are characterized as organic compounds having —$NH_2$ groups linked to carbon constituents of said organic compounds, these difluoroamino-organic compounds are the active ingredients which in combination with or admixed with a carrier are spread into contact with the organisms to be destroyed including such agricultural pests as fungi, insects, nematodes and others. These pesticides can be employed in low concentrations with respect to the composition containing the inert carrier, e.g., concentrations from 2.5 to 0.00001 wt. percent for effective dosage.

What is claimed is:

1. A pesticidal composition comprising an organic compound selected from the group consisting of ethers and hydrocarbons, said compound having an aliphatic hydrocarbon group having from 2 to 6 carbon atoms, and containing —$NF_2$ substituent groups linked to adjacent carbon atom constituents of said aliphatic hydrocarbon group, said compound being admixed with an inert carrier selected from the group consisting of organic solvents and dusting powders, the organic compound being present in said pesticidal composition at a concentration varying from about 2.5 to 0.00001 wt. percent.

2. A pesticidal composition comprising an organic compound admixed with an inert carrier, said organic compound being selected from the group consisting of 1,2,3,1′,2′,3′-hexakis(difluoramino)propyl ether; 2,3-bis(difluoramino)propyl allyl ether; 2,5-bis(difluoramino)dihydrofuran; 2,3,4,5-tetrakis(difluoramino)tetrahydrofuran; 2,3-bis(difluoramino)dioxene; 2,3,5,6-tetrakis(difluoramino)dioxane; 1,4-bis(difluoramino)butene-2; 1,2,3,4-tetrakis(difluoramino)butane; 1,2-bis(difluoramino)cyclohexane; and 1,1-bis(difluoramino)cyclohexane; said inert carrier being selected from the group consisting of organic solvents and dusting powders, the organic compound being present in said pesticidal composition at a concentration varying from about 2.5 to 0.00001 wt. percent.

3. The pesticidal composition of claim 1 wherein said inert carrier is an inert organic solvent selected from the group consisting of acetone, alcohols, hydrocarbons and halogenated hydrocarbons.

4. The pesticidal composition of claim 1 in which said inert carrier is a solid adsorbent on which the organic compound is adsorbed.

5. The pesticidal composition of claim 1 wherein said organic compound is 1,2,3,1′,2′,3′-hexakis(difluoramino)propyl ether.

6. The pesticidal composition of claim 1 wherein said organic compound is 1,2,3,4-tetrakis(difluoramino)butane.

7. A method of destroying agricultural pests which comprises contacting said pests with a mixture of an inert carrier and an organic compound selected from the group consisting of ethers and hydrocarbons, said compound having an aliphatic hydrocarbon group having from 2 to 6 carbon atoms, containing —$NF_2$ substituent groups linked to adjacent carbon atom constituents of said aliphatic hydrocarbon group, said inert carrier being selected from the group consisting of organic solvents and dusting powders.

8. The method of claim 7 wherein said organic compound is present in said mixture at a concentration varying from 2.5 to 0.00001 wt. percent.

References Cited

UNITED STATES PATENTS

| 3,149,165 | 9/1964 | Sausen | 260—583 |
| 3,196,167 | 7/1965 | Logothetis | 260—397.2 |
| 3,214,465 | 10/1965 | Sausen | 260—543 |
| 3,310,444 | 3/1967 | Gould et al. | 149—109 X |

CARL D. QUARFORTH, Primary Examiner

S. J. LECHERT, Jr., Assistant Examiner